United States Patent [19]
Sato

[11] Patent Number: 5,315,453
[45] Date of Patent: May 24, 1994

[54] ROTATING-HEAD VIDEO SIGNAL RECORDING APPARATUS

[75] Inventor: Keiji Sato, Tokyo, Japan

[73] Assignee: Canon Kabushiki Kaisha, Tokyo, Japan

[21] Appl. No.: 783,215

[22] Filed: Oct. 28, 1991

[30] Foreign Application Priority Data

Oct. 31, 1990 [JP] Japan .................. 2-295975

[51] Int. Cl.⁵ .............................. G11B 21/02
[52] U.S. Cl. ...................... 360/75; 360/10.3; 360/35.1; 360/61; 360/64; 358/321
[58] Field of Search .............. 360/10.3, 11.1, 22, 360/33.1, 35.1, 64, 61, 75; 358/321, 320, 325, 338

[56] References Cited

U.S. PATENT DOCUMENTS

| | | | |
|---|---|---|---|
| 4,484,234 | 11/1984 | Kimura | 358/340 |
| 4,609,952 | 9/1986 | Yoshino et al. | 360/70 |
| 4,757,392 | 7/1988 | Awamoto et al. | 358/348 |
| 4,760,468 | 7/1988 | Nakano et al. | 358/320 |
| 4,807,056 | 2/1989 | Sasaki et al. | 360/27 |
| 4,887,169 | 12/1989 | Bannai et al. | 358/335 |
| 5,008,763 | 4/1991 | Horino | 360/70 |
| 5,019,919 | 5/1991 | Nagashimi | 360/22 |
| 5,109,285 | 4/1992 | Koga | 358/337 |

FOREIGN PATENT DOCUMENTS 0179655 4/1986 European Pat. Off. .
0341794 11/1989 European Pat. Off. .

OTHER PUBLICATIONS

Patent Abstracts of Japan, Publication No. JP 63-187781, Publication Date Jul. 12, 1988.

Primary Examiner—Timothy P. Callahan
Assistant Examiner—Terry D. Cunningham
Attorney, Agent, or Firm—Fitzpatrick, Cella, Harper & Scinto

[57] ABSTRACT

In an apparatus for recording a video signal having interlaced fields on a recording medium sequentially using a plurality of rotating heads, a rotational phase of a rotating head relative to a vertical synchronizing signal of the video signal to be recorded is relatively switched for a period corresponding to a phase difference between a vertical synchronizing signal and a horizontal synchronizing signal of each field. It is thereby possible to obtain an excellent video signal without producing discontinuity of horizontal synchronizing signals in a reproducing operation even if a video signal of each field is recorded using any of the plurality of rotating heads having different rotational phases. At that time, objective rotational phases of a rotating cylinder provided with the plurality of rotating heads are present in the same number as the number of rotating heads. Hence, the speed of the start-up synchronizing operation is increased.

14 Claims, 4 Drawing Sheets

FIG. 2(A)
(a)
(b)
(FIRST FIELD) (SECOND FIELD) (FIRST FIELD)
← x

FIG. 2(B)
(a)
(b)
(FIRST FIELD) (SECOND FIELD) (SECOND FIELD)
← x

ROTATING-HEAD VIDEO SIGNAL RECORDING APPARATUS

BACKGROUND OF THE INVENTION

1. Field of the Invention

This invention relates to a video signal recording apparatus which records an interlaced video signal, which forms one frame using a plurality of fields, on a recording medium using rotating heads.

2. Description of the Related Art

An explanation will now be provided illustrating a VCR (video cassette recorder) of a two-head helical scanning type as an apparatus of this kind.

In a conventional VCR, when recording a video signal which forms one frame using two fields, such as an NTSC signal or the like, the field to be recorded by one of two heads having different azimuths is in general assigned to either one of the two fields of each frame.

The reason will now be explained. In the above-described video signal which forms one frame using two fields, the phases of horizontal synchronizing signals relative to vertical synchronizing signals of the preceding field (hereinafter briefly termed a first field) and the succeeding field (hereinafter briefly termed a second field) of each frame are different from each other by a 0.5 horizontal scanning period (H). Accordingly, when, for example, performing so-called connected recording (wherein pictures recorded at different time periods are connected), if a video signal of the same field is recorded on a track immediately before the connected point of recording and on a track immediately after the connected point, the phases of horizontal synchronizing signals are not continuous at the connected point in a reproducing operation, but shift by 0.5 H. This will cause so-called skew distortion on a reproduced image surface, disturbing the image. Hence, a head having one azimuth always records the video signal of the first field, and a head having the other azimuth always records the video signal of the second field.

By thus predetermining the fields of video signals to be recorded by two heads having different azimuths, horizontal synchronizing signals continue even at connecting portions of recorded signals present in connected recording, insertion recording (wherein a picture recorded at a different time period is inserted) or the like. Hence, an image is not disturbed in a reproducing operation.

In the above-described configuration, however, the rotational phase of a rotating head cylinder having two rotating heads must be controlled in synchronization with each frame of the video signal. Hence, a long time is needed to synchronize the rotational phase of the rotating head cylinder with a desired control target phase. For example, when the head for recording the first field traces a magnetic tape, if the input video signal is the signal of the second field, the phase of the rotating head cylinder must be shifted 180°, and a very long time is needed until the rotating head cylinder reaches a servo-locked state. Accordingly, when performing connected recording, insertion recording or the like, the time after the video signal to be recorded has been input and the control of the rotational phase of the rotating head has been started until recording is actually started must be set long, causing a delay of the timing of recording.

SUMMARY OF THE INVENTION

It is an object of the present invention to solve the above-described problems.

It is another object of the present invention to provide a rotating-head video signal recording apparatus which can shorten a time needed for stabilizing the rotational phase of the rotating head, and which can maintain continuity of the horizontal synchronizing signals of a video signal to be recorded.

These and other objects are accomplished, according to one aspect of the present invention, by a video signal recording apparatus comprising (a) a rotating cylinder provided with a plurality of rotating heads having different rotational phases, (b) recording means for sequentially supplying the plurality of rotating heads with a video signal according to an interlaced scanning method, and (c) switching means for relatively switching a phase difference between a rotational phase of the rotating cylinder and a vertical synchronizing signal of the video signal supplied to the plurality of rotating heads from the recording means.

According to a further aspect of the present invention, a video signal recording apparatus comprises (a) a rotating cylinder provided with a plurality of rotating heads having different rotational phases, (b) recording means for sequentially supplying said plurality of rotating heads with a video signal having interlaced video information, and (c) rotational phase control means for controlling a rotational phase of said rotating cylinder relative to a vertical synchronizing signal of said video signal, said rotational phase control means always including a plurality of objective rotational phases.

According to yet another aspect of the present invention, a video signal recording apparatus includes (a) a rotating cylinder provided with a plurality of rotating heads having different rotational phases, (b) recording means for sequentially supplying said plurality of rotating heads with an n:1 interlaced video signal, and (c) rotational phase control means for controlling a rotational phase of said rotating cylinder, said rotational phase control means being capable of shifting an objective rotational phase for a 1/n horizontal scanning period of said video signal.

According to yet a further object of the present invention, a video signal recording apparatus comprises (a) input means for inputting a video signal having interlaced fields, (b) recording means for recording said video signal on a recording medium sequentially using a plurality of rotating heads, and (c) rotational phase control means for controlling rotational phases of said rotating heads, said rotational phase control means being capable of relatively switching the rotational phase of a rotating head relative to a vertical synchronizing signal of the video signal recorded by said recording means for a period corresponding to a phase different between a vertical synchronizing signal and a horizontal synchronizing signal of each field.

The foregoing and other objects and features of the present invention will become more apparent from the following detailed description of the preferred embodiments taken in connection with the accompanying drawings.

BRIEF DESCRIPTION OF THE DRAWINGS

FIGS. 2(A) and 2(B) are timing charts illustrating the operation of the VCR shown in FIG. 1;

DETAILED DESCRIPTION OF THE PREFERRED EMBODIMENTS

Figure 1:
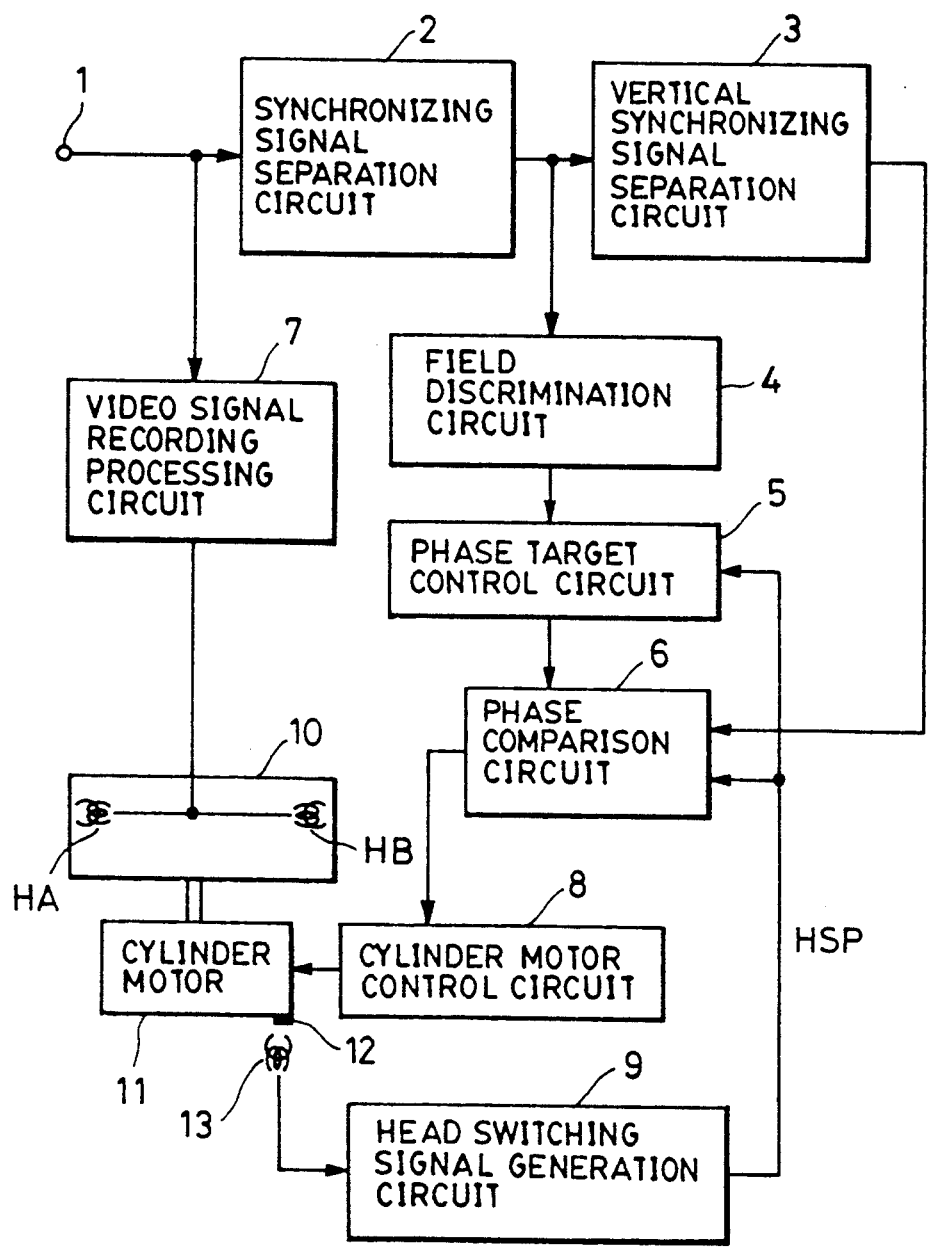
FIG. 1 is a diagram showing the schematic configuration of a VCR according to an embodiment of the present invention.

FIG. 1 is a diagram showing the schematic configuration of a VCR of a two-head helical scanning type according to an embodiment of the present invention;

In FIG. 1, a composite color video signal of a 2:1 interlaced scanning method, such as an NTSC signal or the like, is input to input terminal 1. A synchronizing signal separation circuit 2 separates a composite synchronizing signal including a vertical synchronizing signal and a horizontal synchronizing signal from the video signal input from the input terminal 1. A vertical synchronizing signal separation circuit 3 further separates a vertical synchronizing signal from the composite synchronizing signal separated by the synchronizing signal separation circuit 2. There are also shown a field discrimination circuit 4, and a phase comparison circuit 6. A video signal recording processing circuit 7 places the input video signal in the form of a signal suitable for magnetic recording. There is also shown a cylinder motor control circuit 8. Rotating heads HA and HB have different azimuth angles, and alternately record the video signal for every field while rotating with a phase difference of 180°. A rotating head cylinder 10 is provided with the rotating heads HA and HB at its outer circumferential surface, and guides a magnetic tape, serving as a recording medium, at the outer circumferential surface. A cylinder motor 11 rotates the cylinder 10. A PG magnet 12 is provided at a predetermined phase of the motor 11. A PG head 13 detects the rotational phase of the PG magnet 12.

The operation of the VCR having the above-described configuration will now be explained.

A signal (hereinafter termed a PG signal) output from the PG head 13 represents the rotational phase of the rotating cylinder 10. A pulse, for example, is output every time the cylinder 10 rotates 180°. The PG signal is input to a head switching signal generation circuit 9, which generates a head switching pulse (HSP) which becomes a high level (Hi) with a timing that the head HA traces a video signal recording region on the magnetic tape, and becomes a low level (Lo) with a timing that the head HB traces a video signal recording region.

When recording an NTSC signal, the frequency of the HSP is 30 Hz, and the HSP is input to a phase target control circuit 5 and the phase comparison circuit 6 (to be described later).

The phase comparison circuit 6 compares the phases of the vertical synchronizing signal and the HSP, and outputs a phase error signal so that the phase difference between each vertical synchronizing signal and the HSP becomes a predetermined phase difference (target phase difference). The phase error signal is supplied to the cylinder motor control circuit 8, and is added to a speed error signal to control the cylinder motor 11. The HSP and the vertical synchronizing signal, that is, the rotating heads HA and HB and the vertical synchronizing signal are thereby controlled so as to achieve the target phase difference.

While the frequency of the vertical synchronizing signal is 60 Hz and the frequency of the HSP is 30 Hz, the system is configured so as to be in a control locked state no matter when the HSP is in the predetermined phase relationship with any vertical synchronizing signal. That is, since two control target phases for the rotating cylinder 10 are present for every 180°, the heads HA and HB record either the first or second field. Accordingly, the time needed for reaching control lock of the rotational phase is greatly shortened as compared with when each of the heads HA and HB records only either one of the first and second fields, that is, when the rotating cylinder 10 has only one control target phase, as in the conventional approach.

By performing the phase control of the rotating cylinder 10 in the above-described manner, when, for example, performing connected recording, whether the field to be first recorded is the first field or the second field is not fixed. That is, when reproducing a connected portion x of a video signal, there may arise a case in which the first field and the second field are alternately recorded at the connected portion x as in the conventional approach, as shown in FIG. 2(A), and a case in which the first field or the second field is continuously recorded at the connected portion x, as shown in FIG. 2(B). In FIGS. 2(A) and 2(B), (a) and (b) schematically represent the HSP and the composite synchronizing signal, respectively.

Although, in the present embodiment, the video signal recorded when the HSP is Hi, that is, when the head HA traces a video signal recording region, may be of either the first field or the second field, the control target phase of the rotating cylinder 10 is shifted by ½ H when the head HA records the video signal of the second field.

An explanation will now be provided of this operation.

The field discrimination circuit 4 receives the composite synchronizing signal from the synchronizing signal separation circuit 2, and discriminates whether the input video signal is of the first field or the second field. As the method of such discrimination, there have been known, for example, a method of detecting a phase difference between each vertical synchronizing signal and horizontal synchronizing signal, and a method of counting equalizing pulses within a vertical retrace line period. Since the specific configuration of the field discrimination circuit 4 is not directly related to the present invention, explanation thereof will be omitted.

The field discrimination circuit 4 outputs a field discrimination signal which rises after the vertical retrace line period in the video signal of the first field, and falls after the vertical retrace line period in the video signal of the second field using a known method as described above. The field discrimination signal is supplied to the phase target control circuit 5, and is latched with the rise timing of the HSP. In the present embodiment, the vertical synchronizing signal is subjected to phase lock at a few H after the edge of the HSP. Hence, when the heads HA and HB record the first field and the second field, respectively, the above-described latch output becomes Lo. When the heads HA and HB record the second field and the first field, respectively, the latch output becomes Hi. The latch output is supplied to the phase comparison circuit 6 as a phase target control signal, and shifts the control target phase of the cylinder 10 by 0.5 H when the latch output is Hi.

Figure 3A:
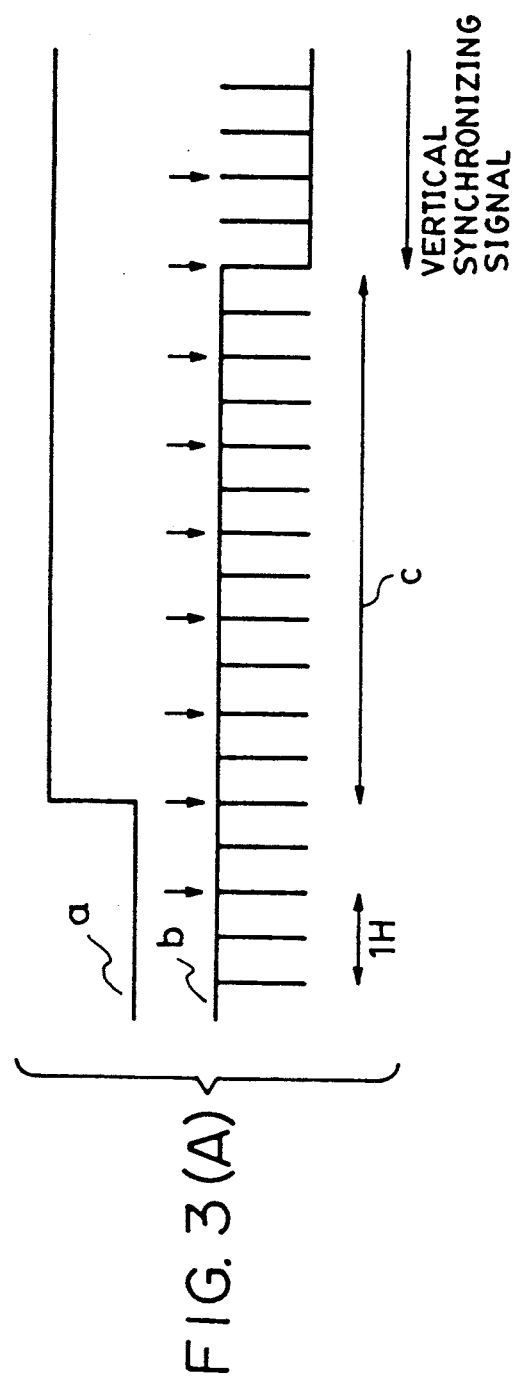
FIGS. 3(A) and 3(B) are timing charts showing the phase relationships between the signals of the first and second fields and head switching pulses, respectively.
Figure 3B:
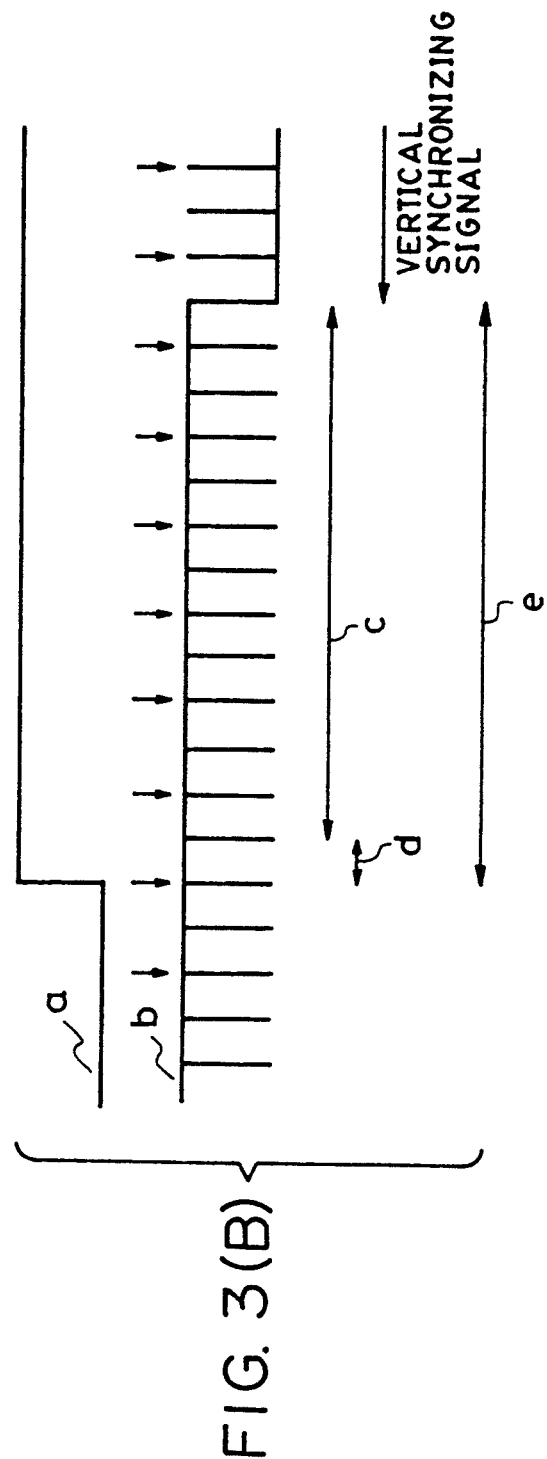

FIGS. 3(A) and 3(B) are diagrams showing the phase relationship between the first field and second field signals and the rise of the HSP, respectively. As shown in FIG. 3(A), the system is controlled so that the phase difference between the leading edge of the vertical synchronizing signal of the first field and the rise of the HSP becomes a predetermined target phase difference c (corresponding to 6 H). In this case, the phase difference between the leading edge of the vertical synchronizing signal of the second field and the fall of the HSP, of course, also becomes 6 H.

When the phase target control signal is Hi, that is, when the head HA records the second field, the control target phase of the cylinder 10 shifts 0.5 H. Hence, as shown in FIG. 3(B), the system is controlled so that the phase difference between the leading edge of the vertical synchronizing signal of the second field and the rise of the HSP becomes a value e (corresponding to 6.5 H) obtained by adding a shift amount d to the predetermined target value c. In this case, the phase difference between the leading edge of the vertical synchronizing signal of the first field and the rise of the HSP, of course, also becomes 6.5 H.

Thus, no matter when the head HA records either the first field or the second field, the phase difference between the HSP and the horizontal synchronizing signal has the same value. In FIGS. 3(A) and 3(B), downward arrows indicate horizontal synchronizing timings.

The shift operation of the control target phase in the phase comparison circuit 6 differs according to the configuration of the circuit 6. If, for example, the circuit 6 comprises an analog circuit, the shift operation can be achieved by delaying the HSP 0.5 H. If the circuit 6 is configured so as to count the number of clock pulses between the rise of the HSP and the leading edge of the vertical synchronizing signal, the shift operation may also be achieved by subtracting the number of clock pulses generated during 0.5 H from the count value.

As described above, in the VCR of the present embodiment, the relationship between the horizontal synchronizing signal and the rotational phase of the head is always the same no matter when each of the heads HA and HB records any of the fields, and continuity of horizontal synchronizing signals is not impaired even if connected portions of the video signal are present due to connected recording, insertion recording or the like. Furthermore, since the rotation of the heads HA and HB may be phase-locked to the vertical synchronizing signal of either the first field or the second field, the servo synchronizing time for the rotating head is shortened, and the time period after the start of the rotating head until recording is actually started can be shortened. Moreover, such scanning can be performed by a very simple change in the configuration, that is, shifting of the phase control target, and no additional circuitry is needed particularly when software servo operation utilizing a microcomputer and the like is performed.

Figure 4:
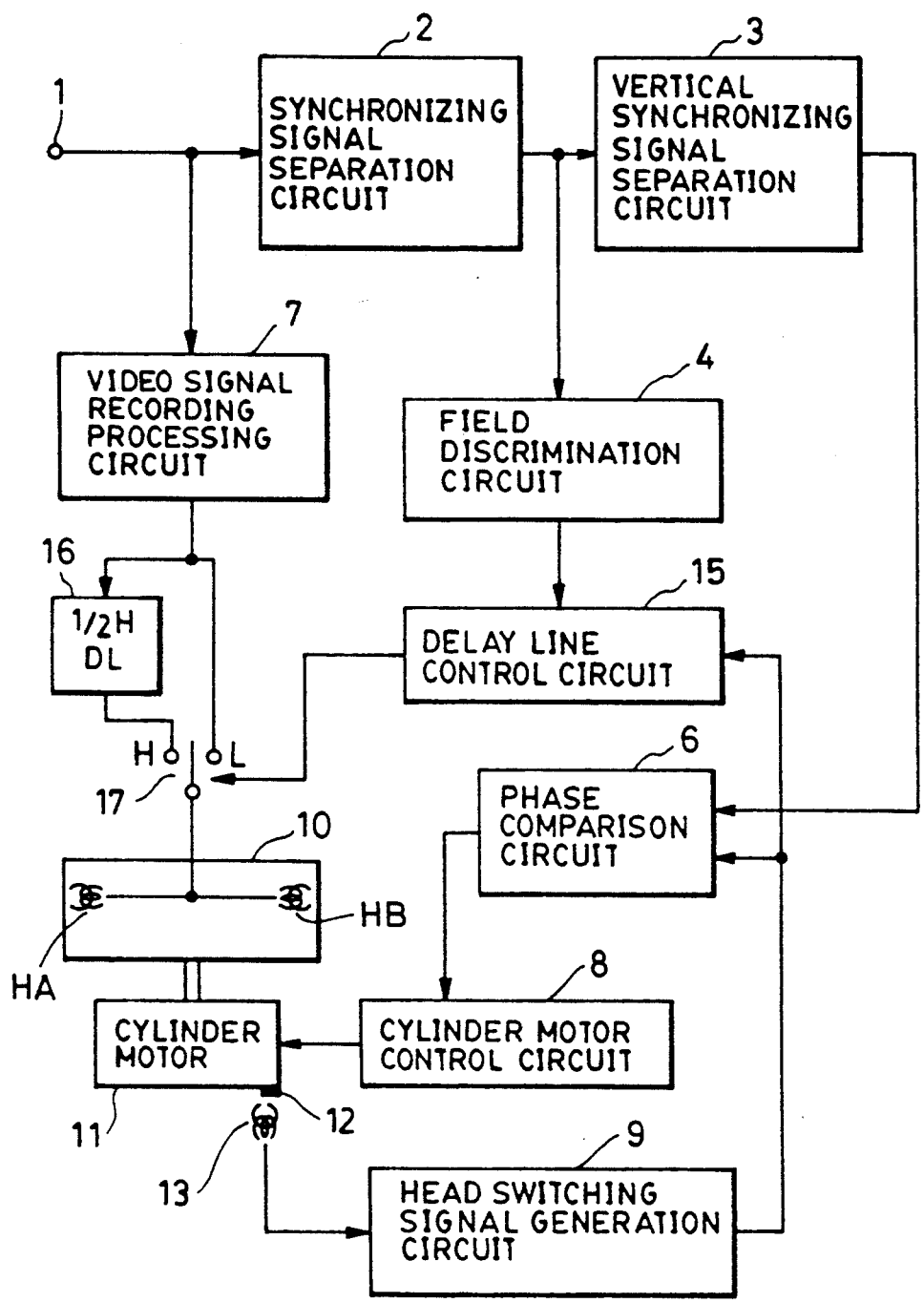
FIG. 4 is a diagram showing the schematic configuration of a VCR according to another embodiment of the present invention.

FIG. 4 is a diagram showing the schematic configuration of a two-head helical scanning VCR according to another embodiment of the present invention. In FIG. 4, the same components as those shown in FIG. 1 are indicated by the same reference numerals, and further explanation thereof will be omitted.

In FIG. 4, there is included a delay line control circuit 15 which becomes Lo when the head HA records the video signal of the first field, and which becomes Hi when the head HA records the video signal of the second field, as the phase target control circuit 5 shown in FIG. 1. In the latter case, a switch 17 is connected to side H. Consequently, when the head HA records the signal of the second field, the signal to be recorded is delayed ½ H by a ½ horizontal scanning period delay circuit (½ H DL).

Also in the above-described configuration, as shown in FIGS. 3(A) and 3(B), the phase relationship between the HSP and the horizontal synchronizing signal becomes always constant. Accordingly, the same effects as in the foregoing embodiment can be expected though additional components, such as the ½ H DL 16, the switch 17 and the like, are needed.

Although, in the above-described embodiments, the phases of the vertical synchronizing signal of the video signal to be recorded and the HSP are relatively shifted by ½ H, the same effects may also be, in general, obtained by shifting the phases by $(n+\frac{1}{2})$ H (n is an integer).

Although, in the above-described embodiments, an explanation has been provided of the two-head helical scanning VCR, the head configuration is not limited to this configuration. The present invention may also be applied when, for example, a magnetic tape is wound around a rotating cylinder over an angular range of at least 270°, and a video signal is sequentially recorded for every field using four heads having phases different from one another by 90° (270°). That is, the same effects may be obtained by configuring servo circuitry so that each head may record either the first field or the second field, and by determining the relationship between the rotational phase of the head and the phase of the vertical synchronizing signal of the video signal to be recorded according to the field which the head has recorded.

Although, in the above-described embodiments, an explanation has been provided illustrating a video signal of a 2:1 interlaced scanning method, the present invention may also be applied, in general, to an apparatus which records a video signal of an m:1 (m is a natural number) interlaced scanning method. In this case, the relationship between the vertical synchronizing signal of the video signal to be recorded and the rotational phase of the head may be set in m kinds, and the length of one frame is long. Hence, better effects may be expected.

The individual components shown in outline or designated by blocks in the Drawings are well-known in the video recording arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video signal recording apparatus, comprising:
    (a) a rotating cylinder provided with a plurality of rotating heads having different rotational phases;

(b) recording means for sequentially supplying said plurality of rotating heads with a video signal having interlaced video information; and (c) control means for controlling a phase difference between said rotating cylinder and a vertical synchronizing signal of said video signal on the basis of a relationship between said plurality of rotating heads and said video signal.

2. An apparatus according to claim 1, further comprising control switching means for switching a target phase of said control means, wherein said control means includes switching means for switching a target phase difference between said rotating cylinder and the vertical synchronizing signal.

3. An apparatus according to claim 1, wherein said control means includes timing switching means for switching a supply timing of said video signal to said rotating heads to control the phase of said rotating cylinder to assume a predetermined target phase with respect to the vertical synchronizing signal of said video signal.

4. An apparatus according to claim 3, wherein said timing switching means includes a delay circuit for delaying said video signal, and a switching circuit for selectively outputting a video signal passing through said delay circuit and a video signal not passing through said delay circuit.

5. An apparatus according to claim 1, wherein said video signal comprises an n:1 interlaced video signal, and wherein said control means includes switching means for switching a target phase difference between said rotating cylinder and the vertical synchronizing signal of the video signal supplied to said plurality of rotating heads from said recording means for a 1/n horizontal scanning period of said video signal, where n is an integer equal to at least 2.

6. An apparatus according to claim 1, wherein said control means controls said rotating cylinder to assume one of a plurality of target phase differences with respect to the vertical synchronizing signal.

7. An apparatus according to claim 6, wherein said rotating cylinder includes m rotating heads, and wherein said recording means sequentially supplies said m rotating heads with said video signal, and wherein said control means always includes m target phase differences, where m is an integer equal to least 2.

8. An apparatus according to claim 1, wherein said control means comprises determination means for determining to which field of each frame each field of said video signal belongs, and switching means for switching a target phase difference between said rotating cylinder and the vertical synchronizing signal, and wherein said target phase difference is switched according to an output of said determination means.

9. An apparatus according to claim 8, wherein said control means further comprises means for generating a head switching signal indicating which of said plurality of heads is to be in a recording state in accordance with a rotation state of said rotating cylinder, and wherein said switching means switches said phase difference in accordance with said head switching signal and an output of said determination means.

10. A video signal recording apparatus, comprising:
(a) a rotating cylinder provided with a plurality of rotating heads having different rotational phases;
(b) recording means for sequentially supplying said plurality of rotating heads with a video signal having interlaced video information; and
(c) control means for controlling a phase difference between said rotating cylinder and a vertical synchronizing signal of said video signal on the basis of a relationship between said plurality of rotating heads and said video signal, said control means always including a plurality of target phase differences.

11. An apparatus according to claim 10, wherein said rotating cylinder includes m rotating heads, wherein said recording means sequentially supplies said m rotating heads with said video signal, and wherein said control means always includes m target phase differences, where m is an integer equal to at least 2.

12. An apparatus according to claim 11, further comprising control switching means for switching a target phase of said control means, wherein said video signal comprises an n:1 interlaced video signal, and wherein said control switching means can shift between said plurality of target phase differences for a 1/n horizontal scanning period of said video signal, where n is an integer equal to at least 2.

13. A video signal recording apparatus, comprising:
(a) a rotating cylinder provided with a plurality of rotating heads having different rotational phases;
(b) recording means for sequentially supplying said plurality of rotating heads with an n:1 interlaced video signal, where n is an integer equal to at least 2; and
(c) control means for controlling a phase difference between said rotating cylinder and a vertical synchronizing signal of said video signal, said control means capable of shifting a target phase difference for a 1/n horizontal scanning period of said video signal.

14. A video signal recording apparatus, comprising:
(a) means for receiving a video signal having interlaced fields;
(b) recording means for recording said video signal on a recording medium sequentially using a plurality of rotating heads; and
(c) control means for controlling phases of said rotating heads, said control means including a switching means for switching a target phase difference between a rotating head and a vertical synchronizing signal of said video signal recorded by said recording means for a period corresponding to a phase difference between a vertical synchronizing signal and a horizontal synchronizing signal of each field.

* * * * *

UNITED STATES PATENT AND TRADEMARK OFFICE
CERTIFICATE OF CORRECTION

PATENT NO. : 5,315,453
DATED : May 24 1994
INVENTOR(S) : KEIJI SATO

It is certified that error appears in the above-indentified patent and that said Letters Patent is hereby corrected as shown below:

COLUMN 2:
    Line 57, "different" should read --difference--.

COLUMN 7:
    Line 46, "least" should read --at least--.

Signed and Sealed this

Twenty-ninth Day of November, 1994

Attest:

BRUCE LEHMAN

Attesting Officer    Commissioner of Patents and Trademarks